US008860672B2

(12) United States Patent
Ewing, Jr. et al.

(10) Patent No.: US 8,860,672 B2
(45) Date of Patent: Oct. 14, 2014

(54) USER INTERFACE WITH Z-AXIS INTERACTION

(75) Inventors: Richard Alan Ewing, Jr., Renton, WA (US); Jonathan L. Mann, Seattle, WA (US); Prarthana H. Panchal, Seattle, WA (US); Parker Ralph Kuncl, Seattle, WA (US); Joshua J. Hinds, Duvall, WA (US); Gabriel Alexander Biller, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 485 days.

(21) Appl. No.: 12/788,145

(22) Filed: May 26, 2010

(65) Prior Publication Data

US 2011/0291945 A1     Dec. 1, 2011

(51) Int. Cl.
*G06F 3/041*     (2006.01)

(52) U.S. Cl.
USPC ........................................... 345/173; 345/175

(58) Field of Classification Search
CPC ............... G06F 3/0482; G06F 3/0485; G06F 2203/04101
USPC .................................................. 345/173, 175
See application file for complete search history.

(56) References Cited

U.S. PATENT DOCUMENTS

| 5,592,195 A | 1/1997 | Misono et al. |
| 5,847,709 A * | 12/1998 | Card et al. ..................... 715/850 |
| 6,034,661 A | 3/2000 | Servan-Scheiber et al. |
| 6,421,694 B1 * | 7/2002 | Nawaz et al. .................. 715/234 |
| 6,504,530 B1 * | 1/2003 | Wilson et al. .................. 345/173 |
| 6,976,228 B2 | 12/2005 | Bernhardson |
| 7,543,234 B2 * | 6/2009 | Daniels et al. ................ 715/742 |
| 7,694,236 B2 * | 4/2010 | Gusmorino et al. .......... 715/838 |
| 8,060,841 B2 | 11/2011 | Boillot et al. |
| 2002/0140746 A1 * | 10/2002 | Gargi ............................ 345/853 |
| 2003/0001898 A1 * | 1/2003 | Bernhardson ................. 345/786 |
| 2004/0233238 A1 * | 11/2004 | Lahdesmaki ................. 345/810 |
| 2005/0210410 A1 | 9/2005 | Ohwa et al. |
| 2006/0107205 A1 | 5/2006 | Makela |
| 2007/0070066 A1 * | 3/2007 | Bakhash ....................... 345/419 |
| 2007/0097093 A1 * | 5/2007 | Ohshita et al. ................ 345/173 |
| 2007/0146321 A1 * | 6/2007 | Sohn et al. .................... 345/158 |
| 2007/0182999 A1 | 8/2007 | Anthony et al. |
| 2007/0214169 A1 | 9/2007 | Audet et al. |
| 2008/0048878 A1 * | 2/2008 | Boillot ........................ 340/686.1 |
| 2008/0066003 A1 * | 3/2008 | Vong ............................. 715/763 |
| 2008/0120572 A1 | 5/2008 | Bahn et al. |
| 2008/0235621 A1 * | 9/2008 | Boillot .......................... 715/810 |
| 2008/0307303 A1 | 12/2008 | Louch et al. |

(Continued)

OTHER PUBLICATIONS

Matuszewski et al., "Contacter: an enhanced contact application for easy update and recovery of contacts using the Session Initiation Protocol (SIP)", IEEE, Portable Information Devices 2007, May 25-29, 2007, pp. 1-6.

(Continued)

*Primary Examiner* — Dorothy Harris
(74) *Attorney, Agent, or Firm* — Lee & Hayes, PLLC

(57) ABSTRACT

A user interface presents a plurality of items configured as a stack in a display of a device. The stack is scrollable in a direction oblique to a plane of the display for successively viewing the items in the stack. Some implementations provide for control of the user interface based on input from a finger position sensor or a slider.

17 Claims, 15 Drawing Sheets

(56) References Cited

U.S. PATENT DOCUMENTS

| | | | |
|---|---|---|---|
| 2008/0307334 A1 | 12/2008 | Chaudhri et al. | |
| 2008/0307335 A1* | 12/2008 | Chaudhri et al. | 715/764 |
| 2008/0307359 A1 | 12/2008 | Louch et al. | |
| 2009/0178009 A1* | 7/2009 | Dotson et al. | 715/841 |
| 2009/0201168 A1* | 8/2009 | Liu et al. | 340/825.22 |
| 2009/0237421 A1* | 9/2009 | Kim et al. | 345/661 |
| 2009/0244019 A1* | 10/2009 | Choi | 345/173 |
| 2010/0070913 A1 | 3/2010 | Murrett et al. | |
| 2010/0079395 A1* | 4/2010 | Kim et al. | 345/173 |
| 2010/0110027 A1* | 5/2010 | Lipman et al. | 345/173 |
| 2010/0153844 A1* | 6/2010 | Hwang et al. | 715/702 |
| 2010/0162105 A1 | 6/2010 | Beebe et al. | |
| 2010/0205186 A1* | 8/2010 | Kaasten et al. | 707/754 |
| 2010/0211872 A1* | 8/2010 | Rolston et al. | 715/702 |
| 2011/0041100 A1* | 2/2011 | Boillot | 715/863 |
| 2011/0115821 A1* | 5/2011 | Huang et al. | 345/660 |
| 2011/0296351 A1* | 12/2011 | Ewing et al. | 715/841 |
| 2012/0212429 A1* | 8/2012 | Okura et al. | 345/173 |

OTHER PUBLICATIONS

Non-Final Office Action for U.S. Appl. No. 12/852,086, mailed on Apr. 25, 2012, Richard Alan Ewing Jr. et al., "User Interface with Z-axis Interaction and Multiple Stacks", 27 pages.

Omvlee, "A novel idea for a new Filesystem" 11th Twente Student Conference on IT, Jun. 29, 2009, 7 pages.

PCT Search Report & Written Opinion mailed Nov. 29, 2011 for PCT Application No. PCT/US11/35964, 9 pages.

Office Action for U.S. Appl. No. 12/852,086, mailed on Nov. 8, 2012, Ewing et al., "User Interface with Z-axis Interaction and Multiple Stacks", 29 pages.

Office Action for U.S. Appl. No. 12/852,086, mailed on Dec. 5, 2013, Richard Alan Ewing, Jr., "User Interface with Z-axis Interaction and Multiple Stacks", 33 pages.

Final Office Action for U.S. Appl. No. 12/852,086, mailed on May 8, 2014, Richard Alan Ewing, Jr., "User Interface with Z-axis Interaction and Multiple Stacks", 43 pages.

* cited by examiner

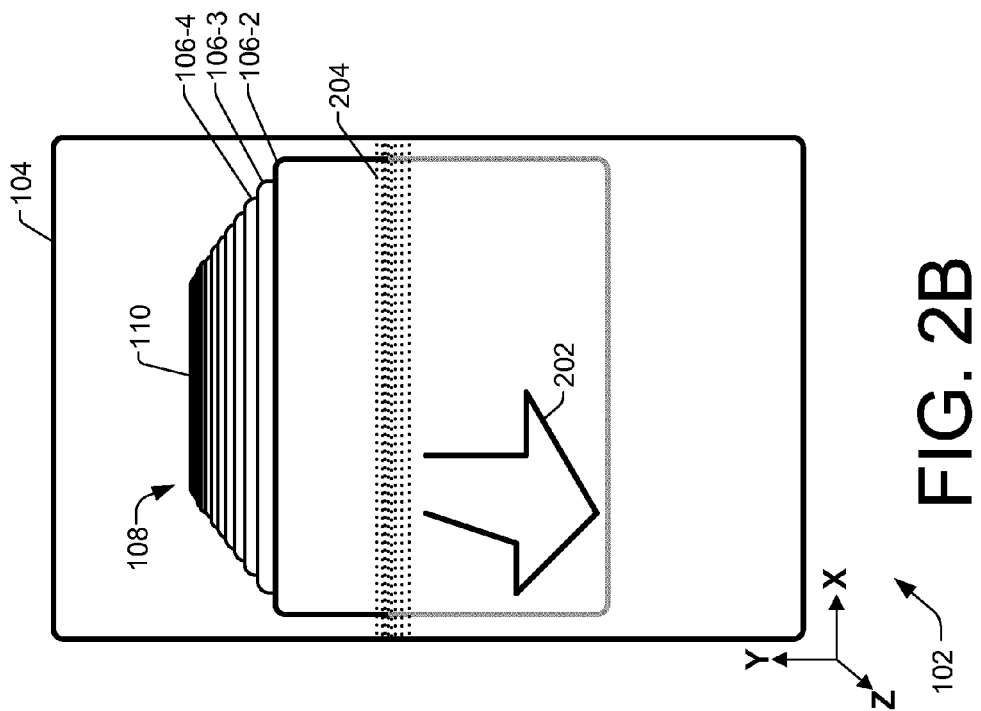
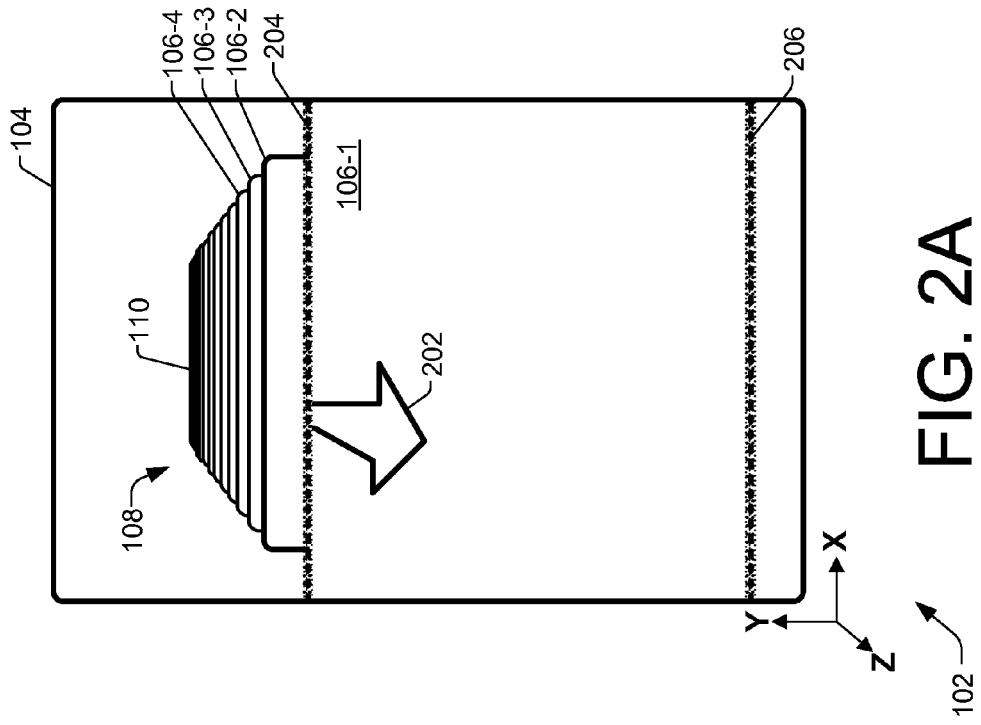

USER INTERFACE WITH Z-AXIS INTERACTION

BACKGROUND

Advances in technology have added an ever-increasing array of features and capabilities to telecommunication devices and other portable computing devices. For example, telecommunication devices may include features such as touch screens, video and still cameras, web browsing capabilities, telephony capabilities, email sending and receiving capabilities, music storing and playback capabilities, calendar and contact managing capabilities, GPS (global positioning system) location and navigation capabilities, game playing capabilities, and television capabilities, to name a few. Many of these features and capabilities are provided through specialized applications resident on the telecommunication devices. For example, many telecommunication devices allow the user to further customize the device through custom configuration options or by adding third-party software. Thus, a variety of applications, such as dedicated computer programs or software, applets, or the like, can be loaded on a telecommunication device by the consumer, the network service provider, or by the telecommunication device manufacturer. Consequently, a typical telecommunication device can maintain a large variety of applications, content items, and the like.

Further, user-friendly graphic user interfaces (GUIs) that are available on many telecommunication devices enable users to perform a wide variety of tasks, such as initiating or receiving phone calls, writing emails or text messages, browsing the Internet, managing device settings and contact lists, and using the large assortment of applications mentioned above. GUIs may also be specific to particular applications, such as applications developed by third party developers. However, because the number of applications and other items present on a telecommunication device may be quite large, only a portion of the applications and other items available can typically be displayed on the GUI at any one time. For example, the GUI of a typical telecommunication device often requires horizontal or vertical scrolling through a number of pages or views to locate a desired application.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIGS. 2A-2B depict scrolling on the z-axis of the user interface according to some implementations.

DETAILED DESCRIPTION

Interactive Three-Dimensional User Interface

Figure 1:
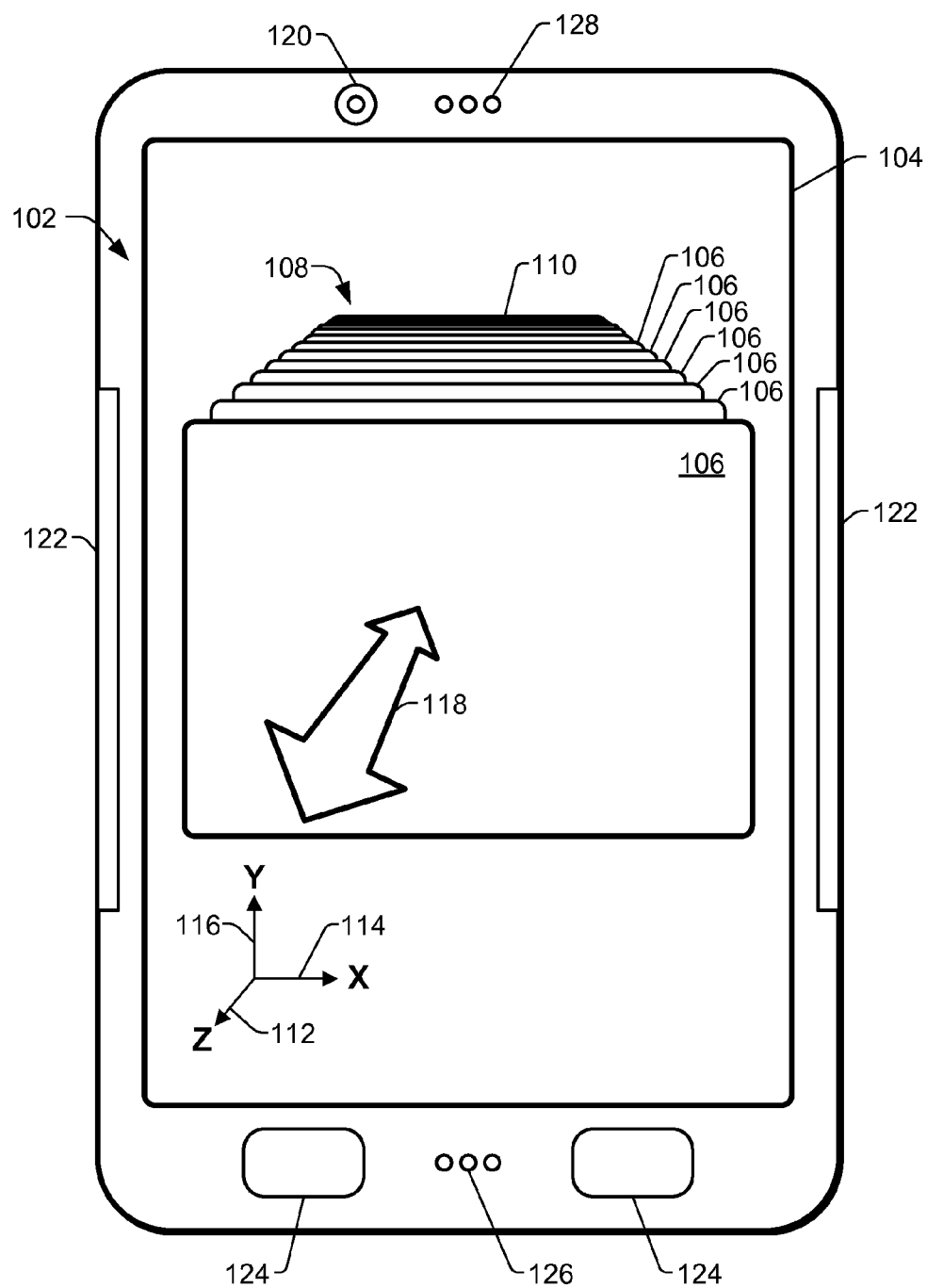
FIG. 1 depicts an example of a device having a user interface according to some implementations disclosed herein.

The technologies described herein are generally directed towards user interfaces for telecommunication devices, touch screen devices, tablet computing devices, and other portable computing devices. Some implementations provide a user interface having an interactive z-axis component. For example, some implementations provide a stack of items that are scrollable in a direction of a z-axis either toward or away from a plane of a display screen of the device. Further, implementations include a method of detecting interaction with a three dimensional user interface having an interactive z-axis dimension based on a user's finger position relative to the device. In some implementations, layers of applications or other items are presented and are scrollable in the z-axis direction. For example, a user may avoid having to move the user interface desktop left/right/up/down to locate an application, and is instead able to scroll through multiple applications or other items in the z-axis direction. The movement through the scrollable items in the z-axis direction may be activated by various controls or inputs, such as by a physical or virtual slider, a touch-free finger position sensing component, and so forth.

According to some implementations, a user interface architecture includes a set of columns or stacks of items displayed and browsable forward or backward along the z-axis direction. Each stack may have a representation on the x-axis or y-axis, such as a name or data type of the stack. For example, the name in the x-axis could be "photos" and the items contained in the stack associated with that name could be representations of albums of photos, individual photos, and so forth. The user interface architecture may also be hierarchical. For example, an item in one stack can represent a folder that includes a number of subfolders. Selection of the item can result in the display of a new set of stacks of items in the user interface in which each of the subfolders are represented along the x-axis as a stack and the items in the subfolders are represented along the z-axis as the items in the stacks.

In some implementations, z-axis browsing is responsive to a detected position of a user's finger in relation to the device rendering the user interface. For example, the device may include one or more sensors for detecting a position of a user's fingertip at a spatially separated distance from the display screen of the device. Movement of the user's fingertip toward or away from the display screen of the device is detected and is interpreted into movement of the user interface along the z-axis direction. Furthermore, lateral translation of the user's finger in the left or right direction relative to the display screen can be interpreted as a panning movement of the user interface in the x-axis direction, while translation of the user's finger in the up or down direction relative to the display screen can be interpreted to pan the user interface in the y-axis direction. Accordingly, implementations herein provide for interaction with a user interface having three dimensions of movement based on a finger-position of the user.

Furthermore, in some implementations, a slider may be provided for the user to scroll in the z-axis direction. For example, in the case of a device having a touch screen display, the slider may be a virtual slider located in a portion of the touchscreen. Alternatively, a mechanical slider or similar mechanism may be provided as part of the device. Employing the slider, the user is able to flip forward and backward through layers of applications or other items displayed in the z-axis direction. In other implementations, tilting of the device is used to control interaction in the z-axis direction. For example, tilt-detection can be activated when the device is in a first position, and the tilting of the device toward or away from the user causes movement of the interface along the z-axis direction.

According to some implementations, multiple columns or stacks of multiple elements are arranged in a grid in which each column or stack represents multiple elements of a similar type. Moving the stacks horizontally or vertically, such as by using swipes, dragging or panning the stacks, moves a focus of the user interface from one element type to another, while navigation in the z-axis direction allows the user to move between individual elements of a particular type. Further, through the use of perspective when displaying the stacks of items in the user interface, a user is able to visually determine the amount of content in a stack by the size of the stack. Thus, the items represented in the user interface can be quickly browsed across several different types of data. Some implementations herein may be employed for rapidly scanning through large groups of brief content, such as contacts, social status updates, really simple syndication (RSS) blurbs, or the like. Further, implementations enable a large number of applications or items to be viewed on a single desktop without necessitating panning or scrolling in the x or y direction through multiple page views. Accordingly, the implementations of the user interface herein provide a scrollable representation of applications or items along a direction of a z-axis to compactly represent, on a single user interface view, a plurality of applications or items associated with multiple desktop user interface views.

Example User Interface

FIG. 1 illustrates an example of a device 100 having a user interface 102, such as a GUI, according to some implementations herein. Device 100 may be a telecommunication device, touch screen device, tablet computing device, or other portable computing device. The user interface 102 may be presented on a display or screen 104 of the device 100. User interface 102 includes a plurality of items 106 arranged in a column or stack 108. In some implementations, items 106 may be representations of applications present on the device 100. The stack 108 presents the items 106 so that the items 106 appear to be stacked in the direction of the z-axis 112 of an x-y-z coordinate system of the user interface 102, in which the z-axis 112 generally appears to extend outward from the display 104, while the x-axis 114 and the y-axis 116 are generally in a plane formed by the display 104. In some implementations, the z-axis may be generally perpendicular the plane of the display 104, while in other implementations, the z-axis may be at a different angle that is oblique to the plane of the display 104.

A user is able to interact with the items 106 to cause the items to move forward or backward along the z-axis, as indicated by arrow 118, so that each of the items 106 may be viewed by the user. For example, the entire stack 108 can be made to appear to move forward and outward of the display 104, so that as each item 106 reaches a certain point it will fade or disappear. The item immediately behind then becomes visible for viewing. Consequently, a user can scroll through and view a large number of items 106 in a relatively short time.

The stack 108 may be arranged with a perspective viewpoint so that as items 106 are placed toward the rear, each item 106 appears smaller and closer together with the next item than with the item in front of it until a horizon 110 is reached where the items appear to blur together. Alternatively, in other implementations, the items 106 may continue to be shown increasingly smaller to a perspective vanishing point. Thus, the stack 108 can provide a user with an indication of a number of items in the stack 108. For example, if only five items 106 are in the stack 108, then all five items can be visible. If a very large number of items are in the stack 108, then the stack may appear to extend far into the screen.

Device 100 may include various controls for controlling the user interface 102. In the illustrated example, device 100 includes a one or more finger position sensors 120 and one or more squeeze or grip sensors 122, the use of which will be described additionally below. Alternatively or in addition, a slider (not shown in FIG. 1) or other mechanism may be provided to enable scrolling in the z-axis direction, as is also discussed below. Device 100 may also include various other controls and features such as control buttons 124, an earpiece 126 and a microphone 128.

FIGS. 2A-2B depict an example of scrolling the items 106 along the z-axis. In the illustrated example, a first item 106 that is in the front of the stack 108 is scrolled forward so that item 106-1 appears to become larger and move outward from the plane of the display, toward the user in the direction of the arrow 202. Furthermore, the entire stack 108 can also appear to move in the direction of arrow 202 at the same time. As the first item 106-1 continues to grow in size, a fade effect may be provided such that the item 106-1 appears to begin to fade and the top edge 204 and bottom edge 206 may begin to blur, as illustrated in FIG. 2A. Continued movement of the first item 106-1 in the z-axis direction causes the first item 106-1 to continue to grow in size and continued to fade away as illustrated in FIG. 2B, until the first item 106-1 completely disappears and the user is presented with a complete view of the second item 106-2 in the stack 108. Consequently, a user is able to successively view each item 106 contained in the stack 108. Furthermore, in some implementations, when the end of the stack 108 is reached, the stack 108 may loop back so that the first item 106-1 may be presented again to the viewer thereby restarting the stack 108. Additionally, the user is able to reverse the direction of scrolling at any point in time so that the stack 108 appears to move inward along the z-axis, away from the user, rather than outward toward the user. Further, rather than employing the fade effect described above, each item 106 may simply disappear or appear at a predetermined point, such as when the item 106 reaches a size too large to fit within the view or focus of the user interface 102 formed by the edges of the display 104. Other variations will also be apparent to those of skill in the art in light of the disclosure here in.

Figure 3:
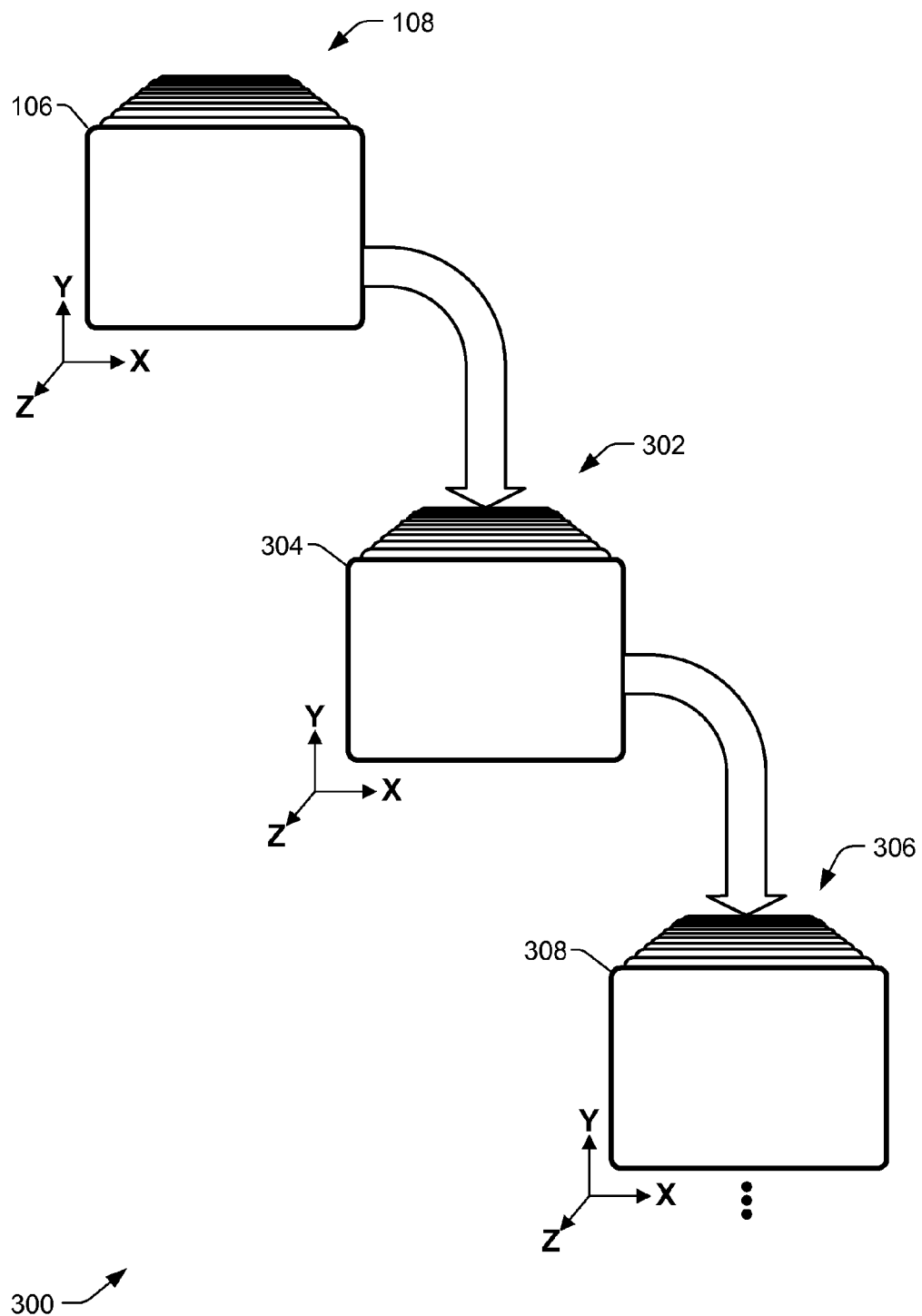
FIG. 3 depicts an example of a hierarchical architecture of a user interface according to some implementations.

FIG. 3 illustrates an example of a hierarchical architecture 300 that may be employed in the user interface 102. A first stack 108-1 of items may be presented to a user in the user interface 102 as described above. The user may scroll through the items until a particular item 106 is located and selected by the user. For example, the items 106 may be applications available on the device 100. Suppose that the selected item is a contact application for organizing contacts of the user. The user interface 102 can then generate a second stack 302 of items 304. For instance, if the selected item 106 is a contact application, then the items 304 may be the contacts of the user. Now suppose that the user scrolls through the items 304 of the second stack 302 until a particular item 304 is located and selected. Selection of the particular item 304 may cause the user interface to generate a third stack 306 of a plurality of items 308. For example, if the user selects a particular contact as the particular item 304 in the second stack 302, then the items 308 in the stack 306 may be the information for the selected contact, such as name, address, telephone number, e-mail address, etc. Accordingly, the hierarchical architecture 300 of the user interface 102 may be applied to numerous types of applications and situations, such as photo viewing applications having photo collections, albums, and individual photos, calendar applications, word processing applications, music applications, and social networking applications, to name a few. Furthermore, to enable a user to return to an upper level stack or a root level stack, one or more controls may be provided, such as control buttons 124 mentioned above in FIG. 1.

Figure 4:
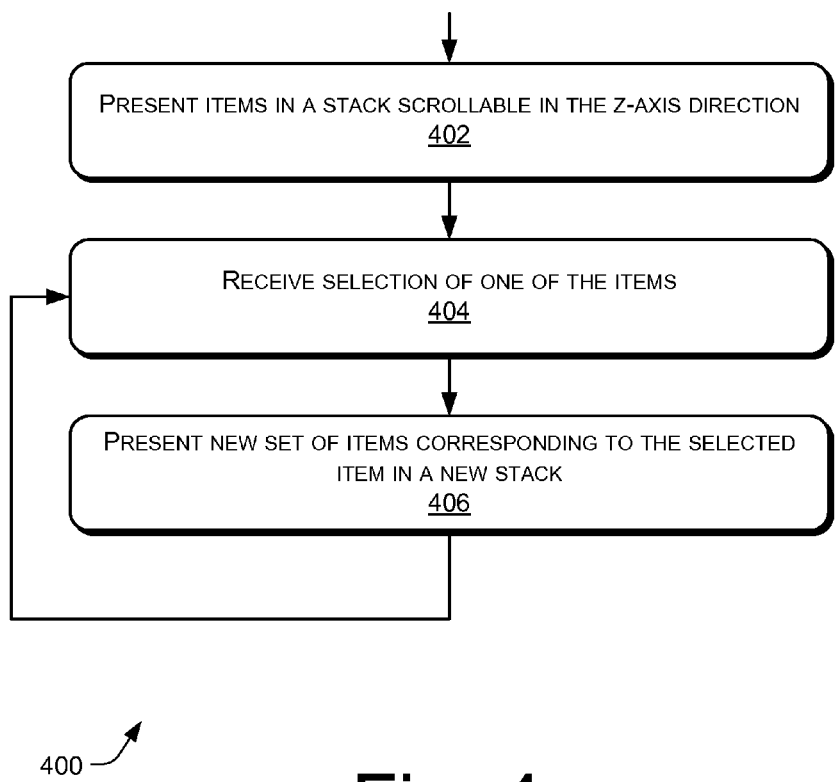
FIG. 4 depicts an example process for navigating a user interface hierarchy according to some implementations.

FIG. 4 illustrates an example flow diagram of a process 400 for a user interface according to some implementations herein. In the flow diagram, the operations are summarized in individual blocks. The operations may be performed in hardware, or as processor-executable instructions (software or firmware) that may be executed by one or more processors. Further, the process 400 may, but need not necessarily, be implemented using the device and interfaces of FIGS. 1-3.

At block 402, multiple items are presented in a stack that is scrollable in the z-axis direction. For example, applications, content items, or the like may be presented in a stack to a user in the user interface 102, and the user is able to scroll forwards or backwards through the stack on the z-axis to locate and select a desired item.

At block 404, the user interface receives a selection of one of the items in the stack. For example, when a user reaches a desired item, the user may stop scrolling and select the item, such as by using a designated control or, in the case of a touchscreen, tapping on the item itself, or the like.

At block 406, the user interface presents a new set of items corresponding to the selected item in a new stack. The user is able to scroll through the new stack to locate a new item to be selected. Consequently blocks 404 and 406 may be repeated a number of times depending on the depth of the hierarchy.

Finger Position Control

Figure 5:
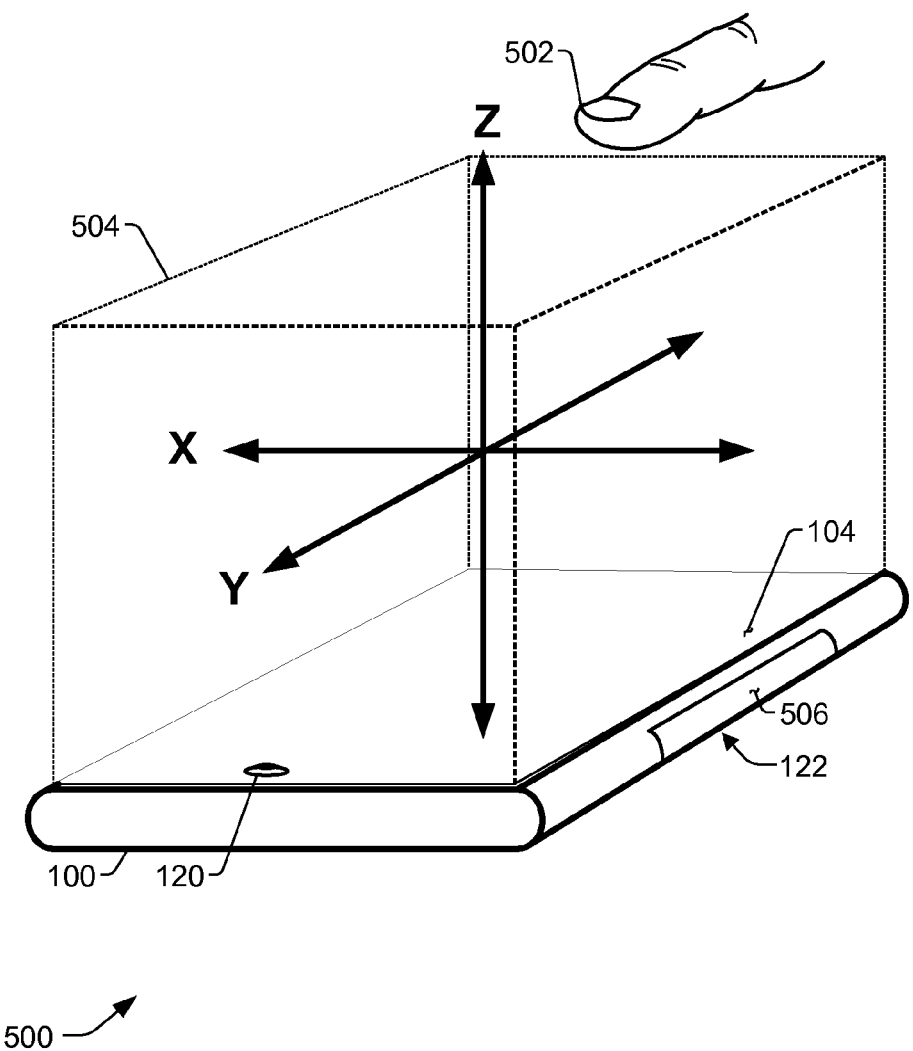
FIG. 5 depicts an example of a finger position control system according to some implementations.

FIG. 5 illustrates an example of a finger position control system 500 that may be implemented for controlling the user interface 102. As mentioned above, device 100 may include one or more finger position sensors 120. Finger position sensor 120 may be, for example an imaging device or sensor able to recognize a fingertip 502 or other part of a user's hand, and track the movement of the fingertip 502 or other part of the user's hand within a space 504 in proximity to the device 100. In some implementations, finger position sensor 120 may detect infrared light projected from an infrared emitter (not shown) to enable use of the finger position control system 500 in the dark or in lowlight conditions. Thus, examples of finger position sensors 120 include a front-facing camera, a infrared light sensor, a non-touch capacitive sensor, or the like. When the finger position sensor 120 has recognized the fingertip 502 of the user, the finger position sensor 120 is able to track the movement of the fingertip 502 in the x, y and z directions relative to a plane of the display 104 of the device 100. These recognized movements of the fingertip 502 can be translated into interactions with the user interface 102, such as for carrying out the z-axis scrolling functions described above.

Additionally, device 100 may include one or more squeeze or grip sensors 122 as a user-activatable input mechanism located on the sides of the device 100 or in another suitable location. For instance, grip sensors 122 may be pressure sensitive sensors or switches that are activated when a sufficient predetermined pressure is applied. Grip sensors 122 are able to be grasped by a user of the device 100 and squeezed for executing certain functions in the user interface 102. For example, one use of grip sensors 122 may be to select an item currently viewed in the user interface 102, although numerous other functions may also be implemented. Further, in some implementations, grip sensors 122 may also be touch sensitive, having a touch-sensitive surface 506 that can detect, for example, the sliding of a user's finger along the surface. Consequently, in some implementations, grip sensors 122 can be used as scroller or slider for controlling interaction with the user interface in the z-axis direction. Alternatively, in other implementations, grip sensors 122 may be employed as a user-activated input mechanism used in conjunction with other inputs, such as finger position for controlling interaction in the z-axis direction. Additionally, while grip sensors are shown on the sides of device 100 in some implementations herein, in other implementations, such as in the case in which device 100 is larger than a palm-sized unit, as in the case of a tablet device, on or more grip sensors may be located elsewhere on the device, such as near one or more corners of the device (e.g., the corner of a touch-sensitive screen) on the back of the device, or other convenient location for gripping the device.

As an example, an initial fingertip position of the finger may be established near the device 100 by squeezing and holding the grip sensors 122 while positioning the fingertip 502 within proximity to the finger position sensor 120. When the initial fingertip position has been established, all movements may be track relative to that point by the finger position sensor 120. For example, movement of the finger tip 502 laterally in a plane parallel to the screen 104 of the device may be interpreted as a real-time panning motion on the user interface in the direction of finger movement.

Figure 6A:
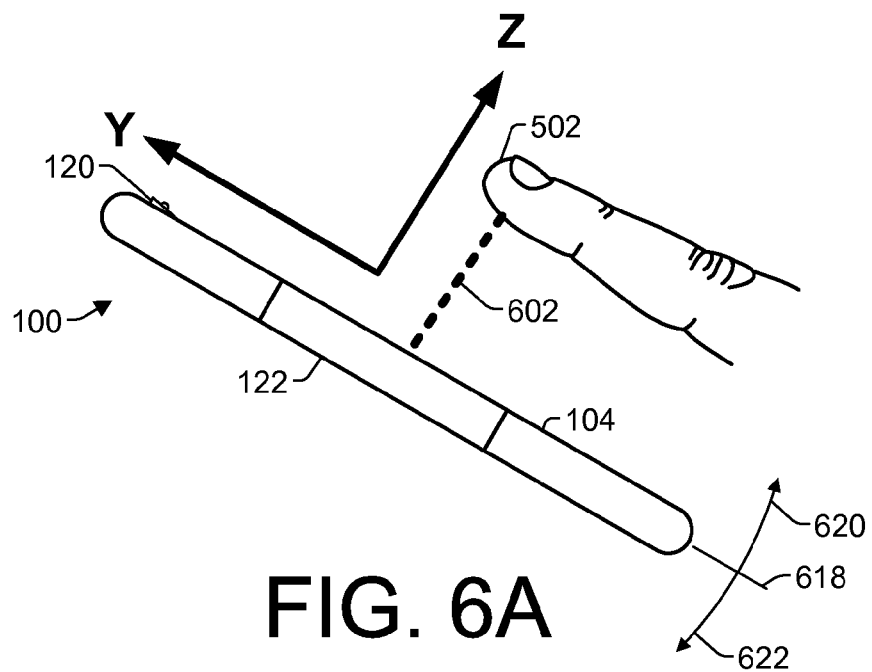
FIGS. 6A-6D depict examples and processes for using the finger position control system or tilting of the device for scrolling on the z-axis according to some implementations.
Figure 6B:
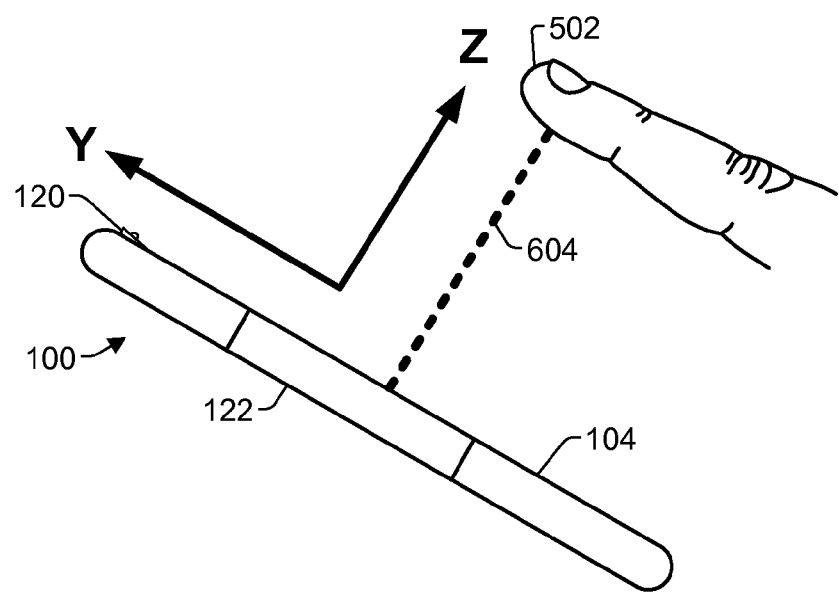

Further, as illustrated in FIGS. 6A-6B, movement of the fingertip 502 in the z-axis direction may also be tracked by the finger position sensor 120. For instance, the fingertip 502 may be located at an initial distance 602 relative to screen 104, as illustrated in FIG. 6A. The fingertip 502 may be moved to a further distance 604 from screen 104 in the z-axis direction which can result in scrolling of the stack 108 of user interface 102 in the z-axis direction, as described above, in the direction of the finger movement. Moving the fingertip 502 in the opposite direction, toward the screen 104 can result in cessation of the scrolling of the stack 108, and when the finger is positioned closer to the screen 104 than the initial distance 602, the stack 108 may scroll in the opposite direction, along the negative z-axis direction.

Figure 6C:
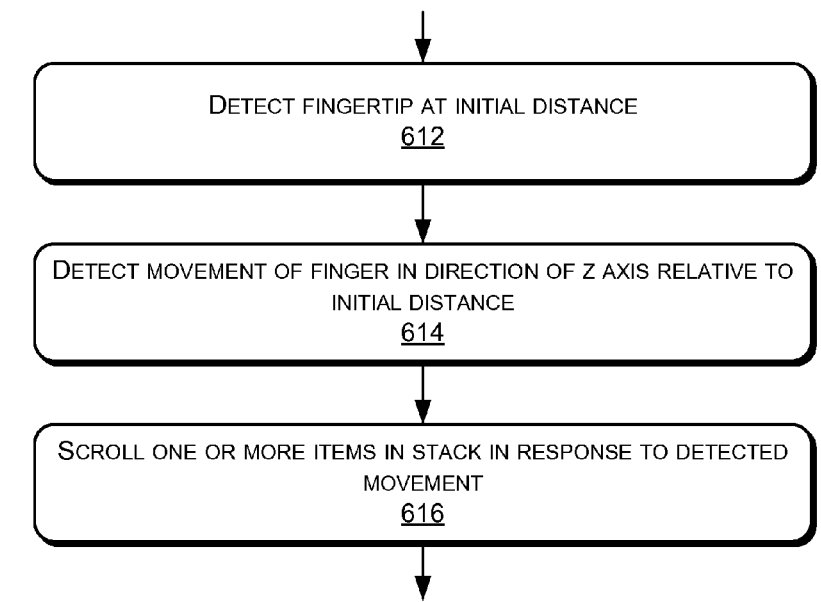

FIG. 6C illustrates an example flow diagram of a process 610 for a user interface according to some implementations herein. In the flow diagram, the operations are summarized in individual blocks. The operations may be performed in hardware, or as processor-executable instructions (software or firmware) that may be executed by one or more processors. Further, the process 610 may, but need not necessarily, be implemented using the device and interfaces of FIGS. 1-5.

At block 612, an initial position of the fingertip of a user is detected by the device 100. For example, an initial fingertip position may be established near the device 100 by squeezing and holding the grip sensors 122 while positioning the fingertip within proximity to the finger position sensor 120.

At block 614, movement of the finger is detected in the direction of the z-axis relative to the initial position. For example, the finger position sensor 120 may detect that the finger has moved toward or away from the initial position.

At block 616, in response to the detected movement of the finger, the user interface 102 scrolls in the direction of the z-axis by moving one or more items in the stack of items presented in the user interface as described above with respect to FIGS. 2A-2B. For example, the finger position sensor 120 may detect how far or how close the finger moves, and the user interface 102 may control the speed of the scrolling relative to the distance that the finger is moved from the initial distance. Moving the finger in opposite direction can slow or reverse the scrolling of the items.

While the finger positioning system 500 has been described in use with the user interfaces described herein, the finger positioning system 500 can also be used with other types of user interfaces for carrying out panning and zooming operations. For example, when viewing a map, the fingertip positioning system 500 in conjunction with the grip sensors 122 can be used to pan and zoom over portions of the map, and can even carry out panning and zooming in a single motion. Further, in other implementations, the finger positioning system 500 may be used for manipulating 3-D objects, 3-D spatial navigation, game control, or the like. Other uses and functions will also be apparent to those of skill in the art in light of the disclosure herein.

Additionally, or alternatively, as illustrated in FIG. 6A, tilting of the device 100 can be used to control interaction with the user interface in the z-axis direction. For example, one or more accelerometers or other motion sensors (not shown in FIG. 6A) may be provided in device 100 for controlling interaction in the z-axis direction. In some implementations, a user may squeeze grip sensors 122 when the device is in a first position 618. Tilting the device 100 in a first direction 620 from first position 618 while continuing to squeeze the grip sensors 122 causes the stack 108 to move or scroll in a predetermined direction, such as toward the user. Tilting the device back in an opposite direction 622 causes the stack 108 to scroll or move in the opposite direction, such as away from the user. Further, the degree of tilt can control the speed at which the scrolling in the z-axis direction takes place, e.g., the further the device is tilted, the greater the speed of the scrolling.

Other variations may also be used. For example, a first squeeze of the grip sensors 122 may turn on the tilt-responsive interaction with the z-axis, while a second squeeze of grip sensors 122 turns off the tilt-responsive interaction. Further, rather than using grip sensors 122, other activation mechanisms may be used, such as touching one of control buttons 124. Additionally, tilting the device to the left or right, rather than forward or backward, can be used for scrolling in the x-axis direction. As another example, touching a location on screen 104 when screen 104 is touch-sensitive may also serve as an activation mechanism for using tilting of the device for interaction with the interface in the z-axis direction.

Figure 6D:
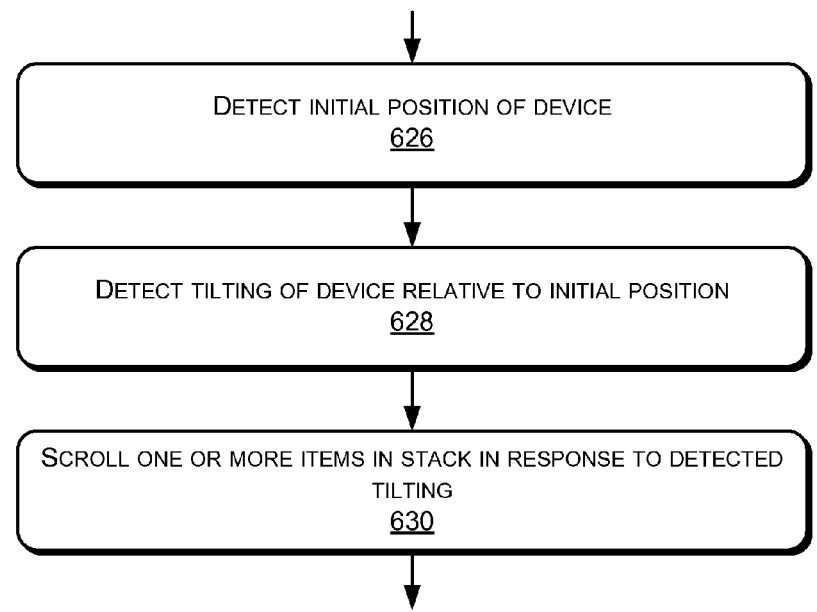

FIG. 6D illustrates an example flow diagram of a process 624 for interacting with a user interface according to some implementations herein. In the flow diagram, the operations are summarized in individual blocks. The operations may be performed in hardware, or as processor-executable instructions (software or firmware) that may be executed by one or more processors. Further, the process 624 may, but need not necessarily, be implemented using the device and interfaces of FIGS. 1-4.

At block 612, an initial position or attitude of the device is detected. For example, an initial position of the device may be established when a user squeezes and holds the grip sensors 122. Other activation mechanisms may also be used to implement the tilting control, as discussed above.

At block 614, tilting of the device is detected relative to the initial position. For example, one or more accelerometers or other motion sensors may be used to detect tilting of the device from the initial position, such as tilting the device forward or backward around the x-axis direction, e.g., rotating part of the device toward or away from the user.

At block 616, in response to the detected tilting of the device, the user interface 102 scrolls in the direction of the z-axis by moving one or more items in the stack 108 of items 106 presented in the user interface, as described above with respect to FIGS. 2A-2B. For example, the motion sensor may detect how far the device is tilted, and the user interface 102 may control the speed of the scrolling relative to the angle of the tilt from the initial position. Tilting the device 100 in the opposite direction can slow or reverse the scrolling of the items 106. Further, tilting the device about the y-axis can cause scrolling the interface in the x-axis direction.

Slider Control

Figure 7:
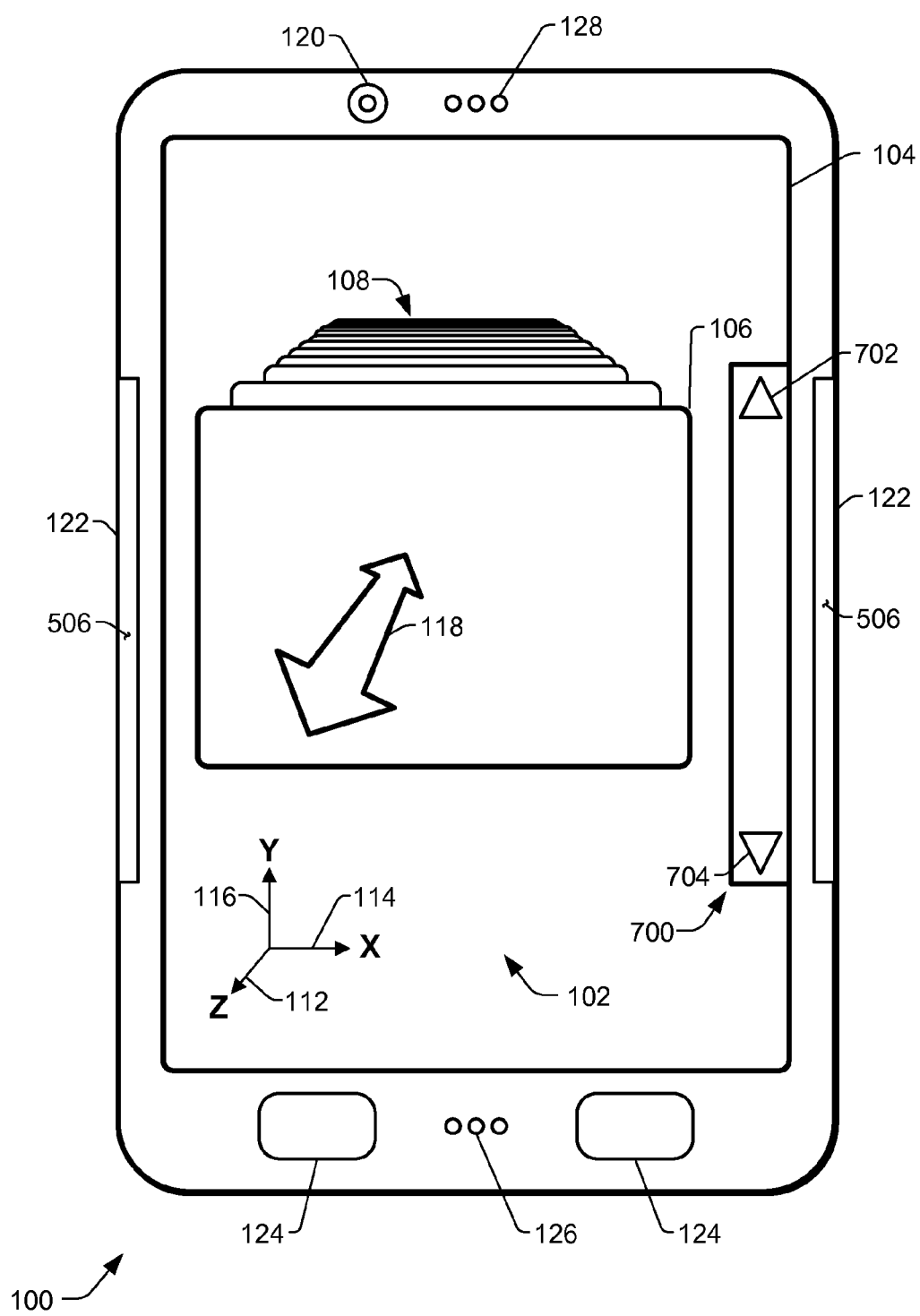
FIG. 7 depicts an example of slider control according to some implementations.

FIG. 7 illustrates an example of a slider control 700 that may be implemented in conjunction with the user interface 102 described above. The slider control 700 may be implemented in addition to or as an alternative to the finger positioning system 500 described above. In the case in which the display screen 104 is a touch sensitive screen, slider control 700 may be a virtual control that is positioned on one side of the display screen 104. As an example, a user may place a finger on the screen 104 in the area designated as the slider control 700, and sliding the finger in one direction such as towards arrow 702 will cause the stack 108 to appear to flow outward from the screen 104, while sliding the finger in the opposite direction towards arrow 704 will cause the stack 108 to appear to move inward away from the user. Further the screen 104 may include pressure sensitive areas located at arrows 702, 704, which when pressed by a finger will cause the stack 108 to flow or scroll in the designated direction so long as the user continues to apply pressure.

Further, as mentioned above with reference to FIG. 5, grip sensors 122 may be touch sensitive, and may serve in place of or in conjunction with slider control 700. For example, a user may slide a finger along the surface 506 of one of grip sensors 122 in a first direction to cause the stack 108 to scroll in a first direction on the z-axis, while sliding the finger along the surface 506 in the opposite direction causes the stack 108 to scroll in the opposite direction. The grip sensors 122 may also include pressure sensitive areas that serve a purpose similar to that of arrows 702, 704 of slider control 700, as discussed above. Other variations for controlling the z-axis interaction will also be apparent in light of the disclosure herein, with the foregoing being mere examples. In addition, as mentioned above, a physical sliding mechanism or scroll wheel (not shown) may also be provided with the device 100, such as in the case in which the screen 104 is not touch sensitive and/or grip sensors 122 are not provided.

Multiple Stack Interface

Figure 8:
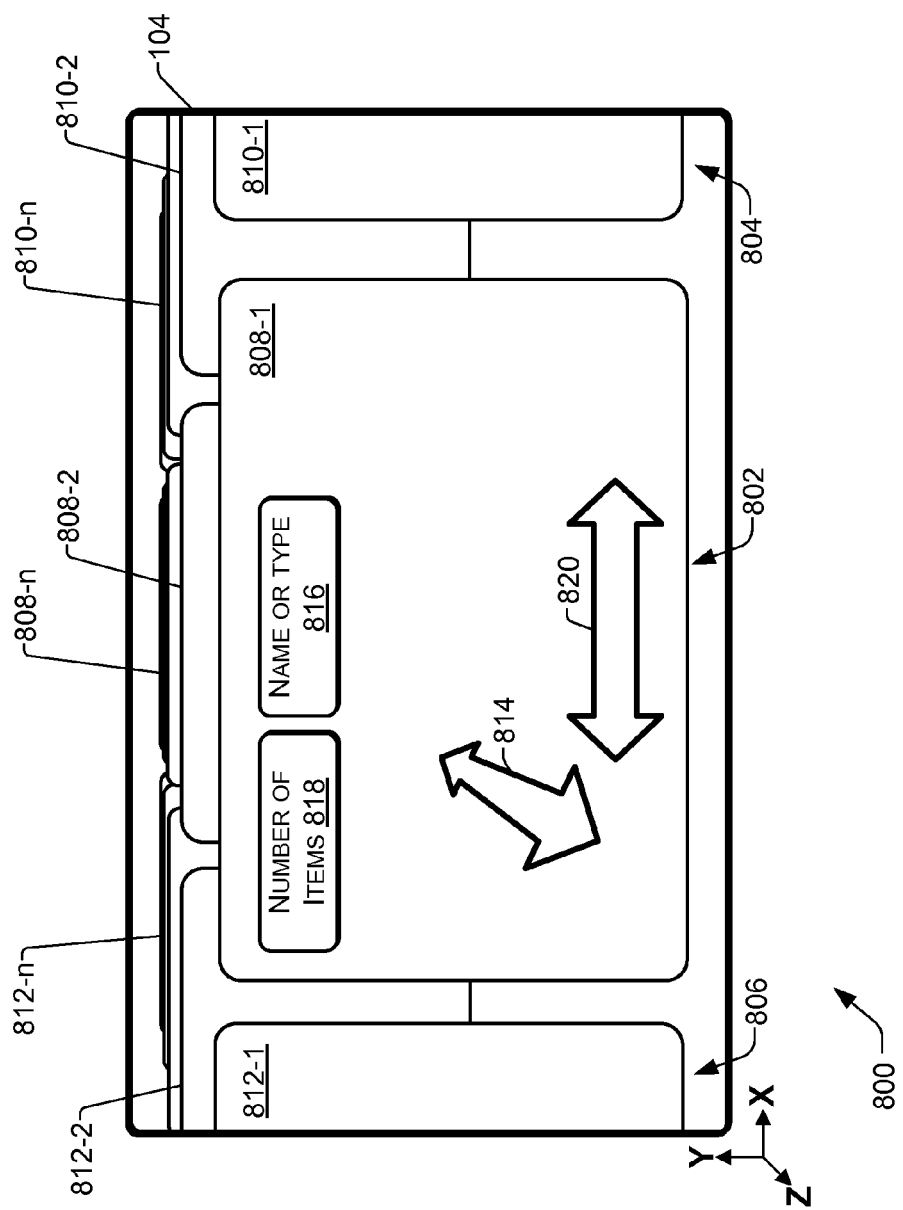
FIG. 8 depicts an example of an interface having multiple sets of items scrollable along the z-axis according to some implementations.

FIG. 8 illustrates an example of a user interface 800, such as a GUI, that includes multiple columns or stacks of multiple items. In some implementations, for improved viewing of the items, the device display 104 may be horizontally oriented as illustrated; however the x-y-z-coordinate system of the user interface 800 may still be maintained in the same orientation regardless of the orientation of the device. For example an accelerometer or other motion sensor (not shown in FIG. 8) can detect when the device display is rotated between portrait and landscape mode, and the user interface can rotate accordingly.

In the illustrated example, the user interface 800 includes multiple stacks 802, 804, 806, in which each stack is made up of multiple items. For example, stack 802 is made up of items 808-1, 808-2, ..., 808-$n$; stack 804 is made up of items 810-1, 810-2, ..., 810-$n$; and stack 806 is made up of items 812-1, 812-2, ..., 812-$n$. The view or focus of the user interface 800 is sized so that a single stack 802 is viewable and large enough to present meaningful information, while a portion of the adjacent stacks 804, 806 are shown to the right and left, respectively, to enable intuitive navigation. Similar to the implementations described above, the items in each stack are displayed and browsable forward or backward along the z-axis direction, as indicated by arrow 814.

Each stack 802-806 may have a representation on the x-axis, such as a name or data type 816 of items in the stack, and may also include an indication 818 of the number of items in the stack. In some implementations, the different stacks may represent different data types or information. For example, one stack may be for contacts, one stack for e-mail, one stack for a calendar, etc. Furthermore, the focus of the user interface may be switched from one stack to an adjacent stack by scrolling or dragging of the stacks in the direction of the x-axis, as indicated by arrow 820. For example, stack 802 may be moved to the left into the position currently occupied by stack 806, which would put stack 804 in the focus of the user interface. This left/right panning or scrolling may be conducted at any location in the stack, thereby switching between data types at the current level of depth, as will be described additionally below.

Figure 9A:
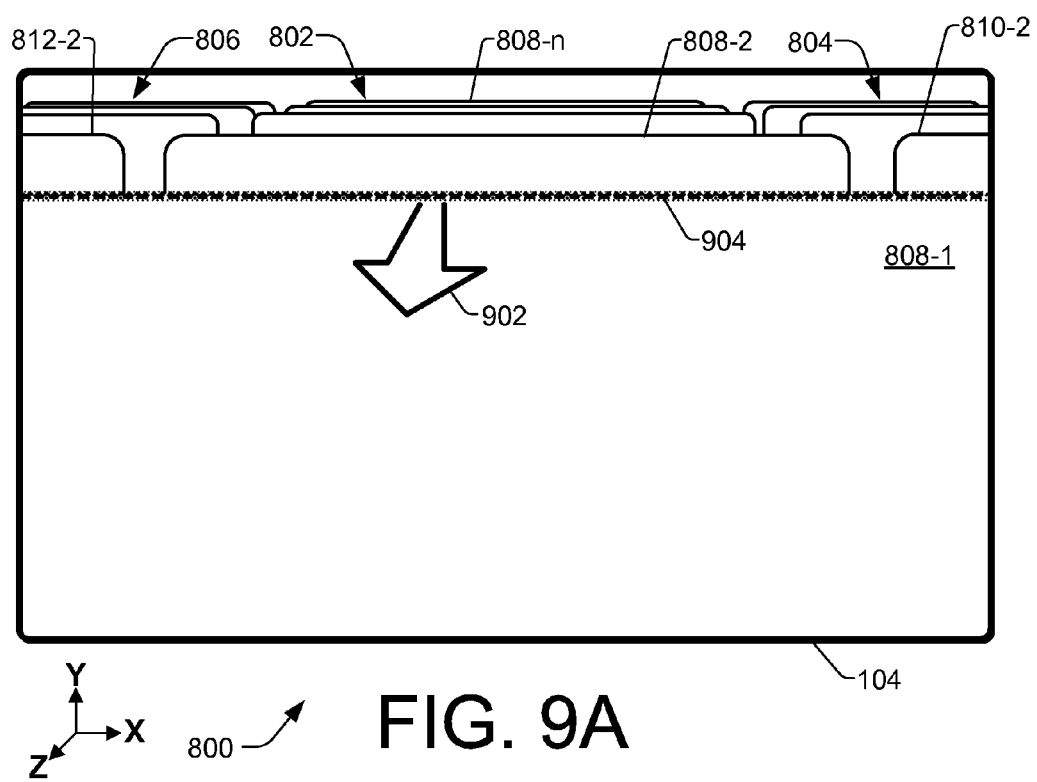
FIGS. 9A-9B depict scrolling on the z-axis of the user interface of FIG. 8 according to some implementations.
Figure 9B:
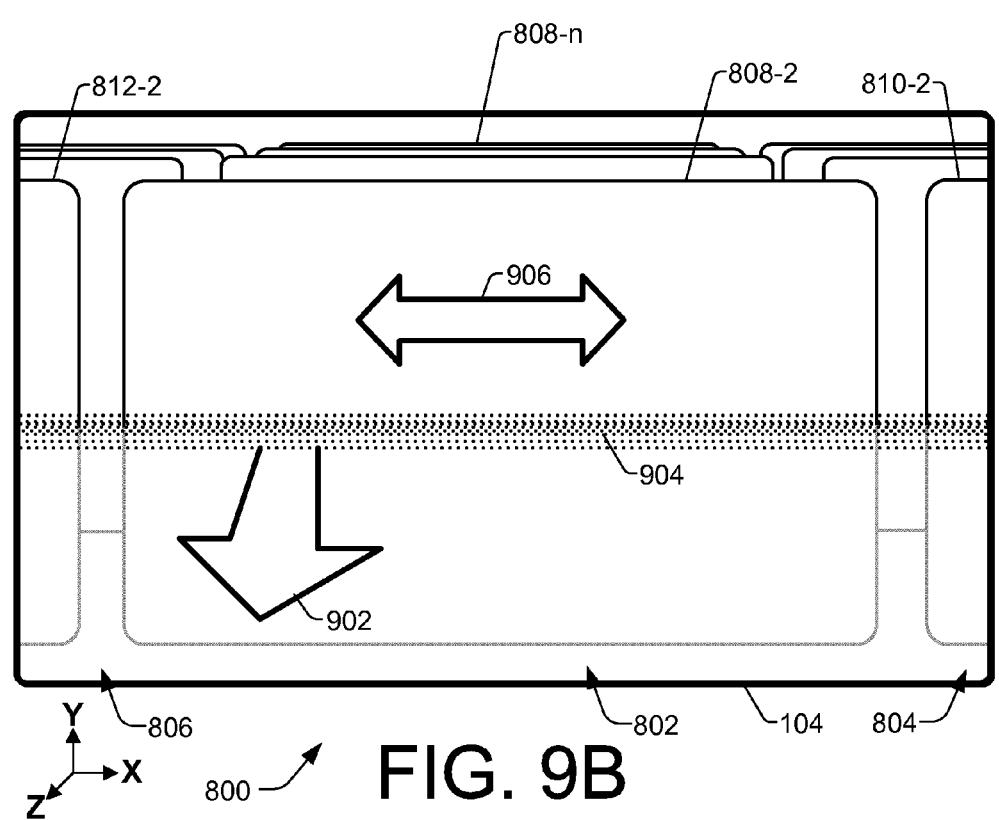

FIGS. 9A-9B depict an example of scrolling the items 808-1, ..., 808-$n$ of stack 802 along the z-axis. In the illustrated example, a first item 808-1 that is in the front of the stack 802 is scrolled forward using a control such as the finger position system or slider controls described above. During scrolling, item 808-1 appears to become larger and move outward from the plane of the display 104 and toward the user in the direction of the arrow 902. Furthermore, the entire stack 802, and stacks 804 and 806 as well, will also appear to move in the direction of arrow 902 at the same time. As the first item 808-1 continues to grow in size, a fade effect may be provided such that the first item 808-1 appears to begin to fade and the top edge 904 may begin to blur, as illustrated in FIG. 9A. Continued movement of the first item 808-1 in the z-axis direction will cause the first item 808-1 to continue to grow in size continued to fade away as illustrated in FIG. 9B, until the first item 808-1 completely disappears and the user is presented with a complete view of the second item 808-2 in the stack 802.

Consequently, a user is able to successively view each item 808 contained in the stack 802. Furthermore, in some implementations, when the end of the stack 802 is reached, the stack 802 may loop back so that the first item 808-1 is presented again to the viewer thereby restarting the stack 802. Additionally, the user is able to reverse the direction of scrolling at any point in time so that the stack 802 and the stacks 804 and 806 appear to move inward along the z-axis, away from the user, rather than outward from the user interface. Further, rather than employing the fade effect described above, each item 808 may simply disappear or appear at a predetermined point, such as when the item 808 reaches a size too large to fit within the view of the user interface 800. Other variations will also be apparent to those of skill in the art in light of the disclosure here in.

Additionally, as depicted in FIG. 9B, when item 808-2 is presented, the user may continue to scroll forward or backwards in the z-axis direction, or alternatively, the user may scroll in the x-axis direction, as indicated by arrow 906. This enables the user to directly switch from one data type to another data type without having to return to the front of the stack of a particular data type. For example, the user may move directly from item 808-2 to item 812-2, which is of a different data type, but at the same level of depth as item 808-2. Alternatively, in other implementations when the user attempts to scroll in the x-axis direction to an adjacent stack 804, 806 from within the stack 802, the user interface 800 may automatically reposition the focus at the front or first item of the adjacent stack 804, 806. The lateral scrolling in the x-axis direction may be performed in response to sensing a change in position of a fingertip due to lateral movement, as described above, or may be performed in response to a swipe or drag performed on a touch screen of the device 100, or other navigation command. In other implementations, multiple stacks may be arranged to be scrollable in the direction of the y-axis for moving from one stack to the next stack, rather than in the direction of the x-axis. Further, in some implementations the multiple stacks may be laid out in a grid in which the user may navigate in both the x-axis direction and the y-axis direction for moving between multiple stacks of different data types, content items, applications, and so forth, each scrollable in the z-axis direction.

Figure 10:
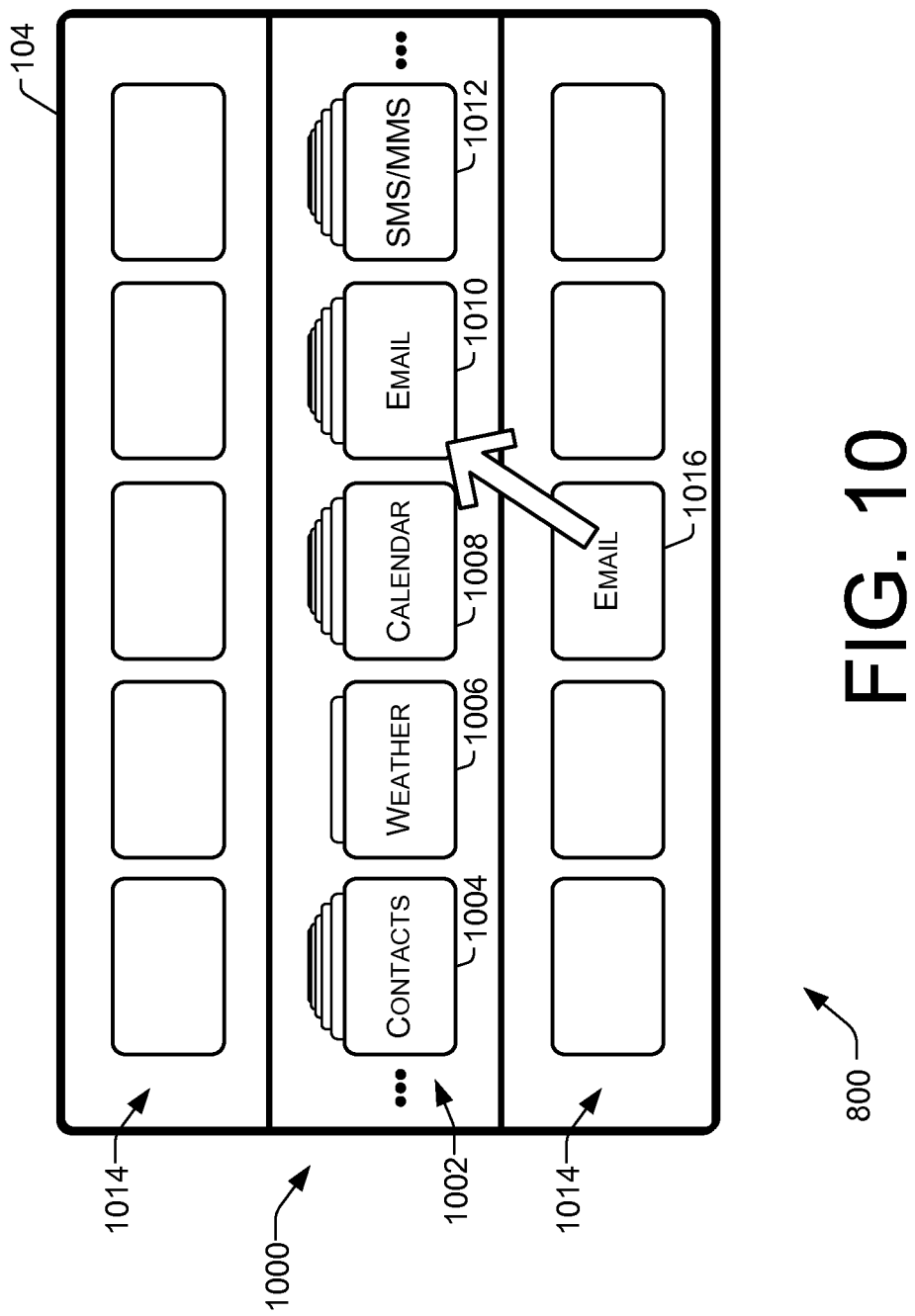
FIG. 10 depicts an example of a flow interface according to some implementations.

As illustrated in FIG. 10, some implementations of the user interface 800 may be configured as a ribbon or flow 1000 of stacks 1002 containing updates and information to be provided to a user. For example, the flow 1000 may include stacks of various different data types, with the most recent update to the data type presented as the front or first item in the corresponding stack. In the illustrated example, the stacks 1002 of data types include contacts 1004, weather 1006, calendar 1008, e-mail 1010, and SMS/MMS content 1012. The user can zoom out to view all the available data 1014 for the flow 1000 as illustrated in FIG. 10, and then choose to add or remove particular data types to and from the flow 1000. For example as illustrated in FIG. 10, the user has decided to drag the e-mail icon 1016 into the flow 1000, thereby placing the e-mail stack 1008 into the flow 1000. When the user is finished adding or removing the data types from the flow 1000, the user can zoom back in and be presented with a user interface 800, such as that illustrated in FIG. 8 described above.

Additionally, in some implementations, rather than adding or removing entire data types to the flow 1000, a user may add one or more items of a particular data type. For example, if the user has received updates from a social networking site, the user can add one or more updates of interest to the flow 1000 for subsequent review, while leaving other updates out of the flow 1000. For example, if the user has a stack for social network, the selected one or more items are added to the stack, or the selected items may merely be added to the flow 1000 separate from any other stack.

In another variation, rather than having the user add stacks to the flow 1000, one or more stacks may be automatically added, such as when one or more relevant updates are received for a particular data type. For example, suppose that the user receives a new text message. Upon receipt of the text message, the SMS/MMS stack 1012 may be automatically added to the flow 1000. After the user has viewed the text message, the SMS/MMS stack 1012 may then automatically be removed from the flow 1000. When another new text message is received, the SMS/MMS stack 1012 is again added back to the flow 1000. This automatic addition and removal of stacks can be extended to include updates to any of the different data types. Further, rather than adding an entire stack that includes both new updates and items already viewed, the items or stacks added to the flow 1000 may be just the newly received or updated items. As another example, one of the stacks in the flow 1000 may be designated as containing newly-received updates of various different data types. Thus, the user can then just scroll through this one stack to view updates to various different data types, e.g., new text messages, new emails, new social networking updates, or the like. These updates can also be added to their corresponding data type stack as well, to provide the user with the option to view updates according to data type.

In some implementations, the flow 1000 may be configured to automatically scroll across the view in the x-axis direction and momentarily pause on each stack before moving to a subsequent adjacent stack. The flow 1000 may loop to create a continuous experience. The flow direction and speed may be adjusted by the user, and when the user wishes to view a particular stack's content, the user can stop the flow such as with a finger tap and scroll along the z-axis to view the content of the particular stack. Furthermore, in addition to including the name of the data type 816 described above, the stacks may be visually distinct from each other in other ways, such as being color-coded, having distinct icon shapes, or the like. Additionally, the number of items in each stack may be visually indicated by depth of the stack, as discussed above, and/or the numerical indicator 818 may indicate the number of items in each stack. Furthermore, while the flow 1000 has been described in some implementations as displaying recent updates and information, in other implementations, the flow 1000 may be populated with stacks of other types. For example, the user may populate the flow 1000 with applications that the user frequently uses, or the like. Further, while some implementations provide constant movement of the flow 1000, in other implementations the movement is only initiated by the user, such as by swiping on a touch screen.

Figure 11:
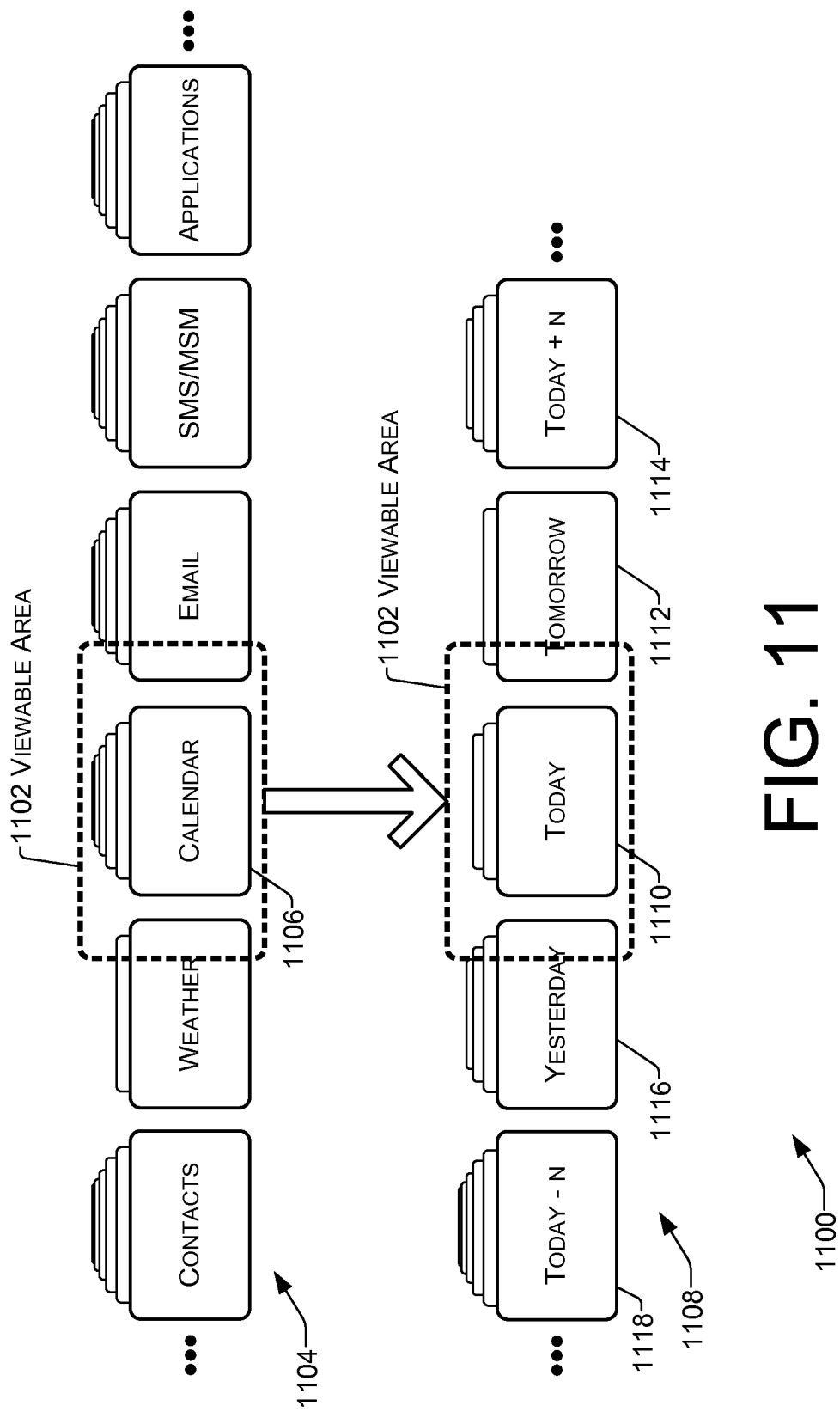
FIG. 11 depicts an example of a hierarchical architecture for multiple sets of items for z-axis interaction according to some implementations.

FIG. 11 depicts a hierarchical architecture 1100 that may be applied in some implementations of the user interface 800. FIG. 11 illustrates a focus or viewable area 1102 of the user interface 800 through which a plurality of stacks 1104 of data types may be moved and viewed as described above. Further, as illustrated in FIG. 11, in some implementations, the user interface may also create a plurality of stacks of data types for a particular selected application or data type when selected by the user. For example, when the user selects the calendar application 1106, the user interface can create a new plurality of stacks 1108 corresponding to the selected application or data type. For example, for the calendar application 1104, the stacks 1108 may include a stack 1110 for the current day that may include a plurality items, such as appointments for the current day that are viewable by scrolling along the z-axis. The stacks 1108 may further include a plurality of other stacks viewable by movement of the focus along the x-axis direction, such as a tomorrow stack 1112, one or more stacks 1114 for one or more days after tomorrow, a yesterday stack 1116, and one or more stacks 1118 for one or more days prior to yesterday, each of which may include items scrollable along the z-axis, as described above.

Example Device

Figure 12:
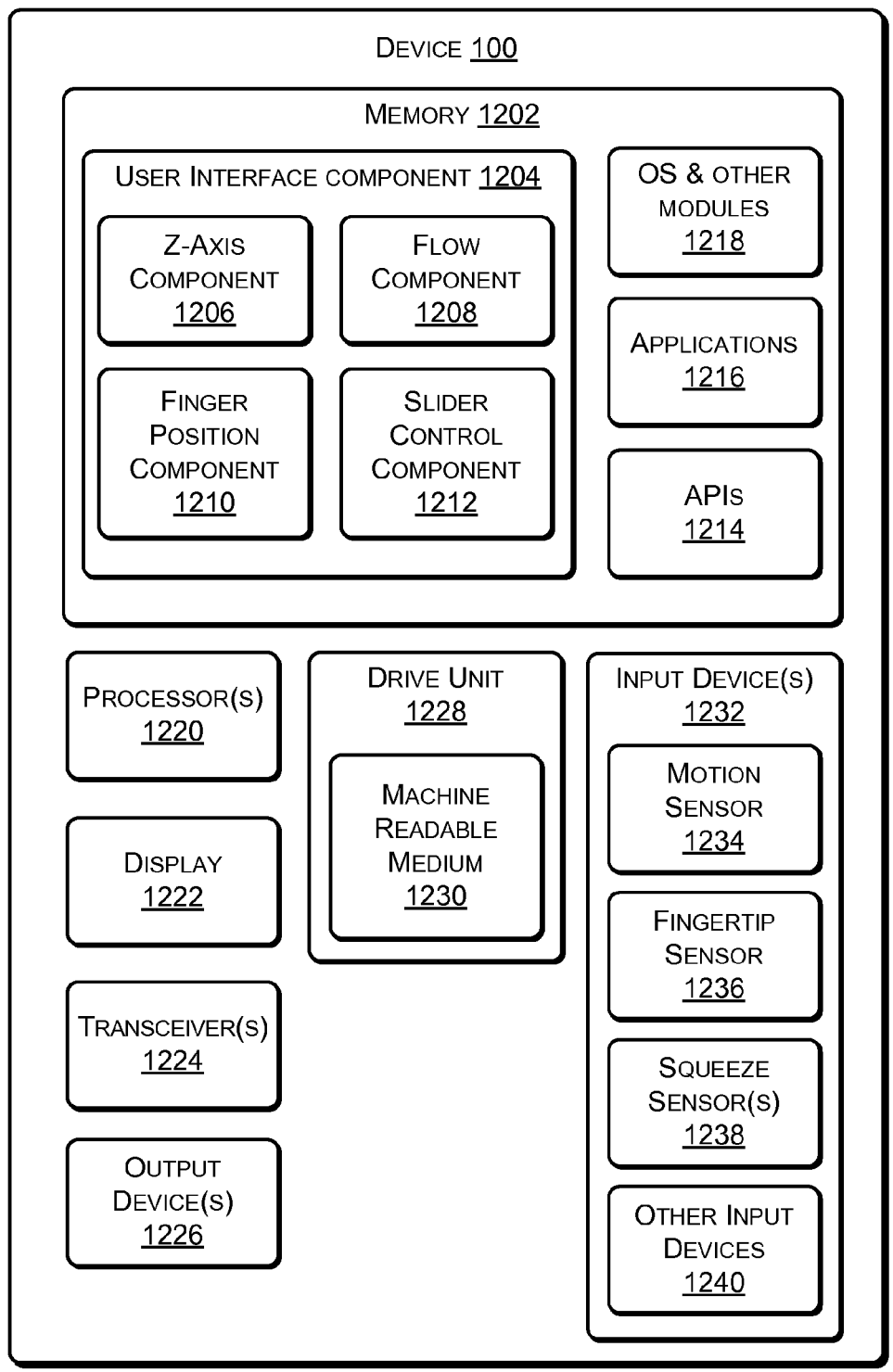
FIG. 12 depicts an example of a component level view of a device according to some implementations.

FIG. 12 illustrates an example of a component level view of the device 100 in accordance with some implementations, and which may correspond, for example, to a telecommunication device, touch screen device, tablet computing device, or the like. As shown, the device 100 may include a memory 1202 having a user interface component 1204 maintained thereon. The user interface component 1204 may include a z-axis component 1206 for implementing the z-axis scrolling functions described herein, a flow component 1208 for implementing the multiple movable stack interface described herein, a finger position component 1210 for implementing the finger position control described herein, and a slider control component 1212 for implementing the slider control described herein. Memory 1202 may also include APIs 1214, applications 1216, such as user applications, and an operating system (OS) and other modules 1218. The device 100 may further include one or more processors 1220, a display 1222, one or more transceiver(s) 1224, one or more output device(s) 1226, and a drive unit 1228 including a machine readable medium 1230, and input devices 1232. Input devices 1232 may include a motion sensor 1234, such as one or more accelerometers, a fingertip sensor 1236, such as finger position sensor 120 described above, one or more squeeze or grip sensor(s) 1238, such as squeeze or grip sensors 122 described above, and other input devices 1240.

In various implementations, memory 1202 generally includes both volatile memory and non-volatile memory (e.g., RAM, ROM, Flash Memory, miniature hard drive, memory card, or the like). Additionally, in some implementations, memory 1202 includes a SIM (subscriber identity module) card, which is a removable memory card used to identify a user of the device 100 to a telecommunication service provider.

In some implementations, the user interface component 1204 implements the user interfaces described above, including the user interface 102 and the user interface 800. The user interface component 1204, including the z-axis component 1206, the flow component 1208, the finger position component 1210 and the slider control component 1212 may comprise a plurality of executable instructions which may comprise a single module of instructions or which may be divided into any number of modules of instructions.

In various implementations, the APIs 1214 provides a set of interfaces allowing application providers to create user interfaces that provide for the z-axis scrolling and x-axis translation of sets of z-axis-scrollable items, as described herein. The interfaces of the APIs 1214 may in turn correspond to a set of functions, such as a function for generating a user interface or a function for enabling control of a user interface with a finger position control system or a slider. Such functions may take as parameters a set of parameters and user interface element pairs, as well as an identifier of the application, OS, platform, or device to which the user interface elements belong.

In various implementations, the applications 1216 and the OS and other modules 1218 comprise any executing instructions on the device 100. Such instructions include, for example, an OS of the device 100, drivers for hardware components of the device 100, applications providing interfaces to settings or personalization of the device 100, applications made specifically for the device 100, and third party applications of application providers. Collectively these applications/processes are hereinafter referred to as applications 1216 and OS and other modules 1218, which may be entirely or partially implemented on the device 100. In some implementations, the applications 1216 and OS and other modules 1218 are implemented partially on another device or server.

In some implementations, the processor 1220 is a central processing unit (CPU), a graphics processing unit (GPU), or both CPU and GPU, or other processing unit or component known in the art. Among other capabilities, the processor 1220 can be configured to fetch and execute computer-readable instructions or processor-accessible instructions stored in the memory 1202, machine readable medium 1230, or other computer-readable storage media.

In various implementations, the display 1222 is a liquid crystal display or any other type of display commonly used in devices, such as telecommunication devices. For example, display 1222 may be a touch-sensitive touch screen, and can then also act as an input device or keypad, such as for providing a soft-key keyboard, navigation buttons, or the like.

In some implementations, the transceiver(s) 1224 includes any sort of transceivers known in the art. For example, transceiver(s) 1224 may include a radio transceiver and interface that performs the function of transmitting and receiving radio frequency communications via an antenna. The transceiver(s) 1224 may facilitate wireless connectivity between the device 100 and various cell towers, base stations and/or access points.

Transceiver(s) 1224 may also include a near field interface that performs a function of transmitting and receiving near field radio communications via a near field antenna. For example, the near field interface may be used for functions, as is known in the art, such as communicating directly with nearby devices that are also, for instance, Bluetooth® or RFID enabled. A reader/interrogator may also be incorporated into device 100.

Additionally, transceiver(s) 1224 may include a wireless LAN interface that performs the function of transmitting and receiving wireless communications using, for example, the IEEE 802.11, 802.16 and/or 802.20 standards. For example, the device 100 can use a Wi-Fi interface to communicate directly with a nearby wireless access point such as for accessing the Internet directly without having to perform the access through a telecommunication service provider's network.

In some implementations, the output device(s) 1226 include any sort of output devices known in the art, such as a display (already described as display 1222), speakers, a vibrating mechanism, tactile feedback mechanisms, and the like. Output device(s) 1226 may also include ports for one or more peripheral devices, such as headphones, peripheral speakers, or a peripheral display.

The machine readable storage medium 1230 stores one or more sets of instructions (e.g., software) embodying any one or more of the methodologies or functions described herein. The instructions may also reside, completely or at least partially, within the memory 1202 and within the processor 1220 during execution thereof by the device 100. The memory 1202 and the processor 1220 also may constitute machine readable medium 1230. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices, such as memory 1202. Thus, the processes, components and modules described herein may be implemented by a computer program product.

In some implementations, fingertip sensor 1236 includes an imaging device or other component to recognize and track a position of a finger. Further, other input devices 1238 include any sort of input devices known in the art. For example, input device(s) 1238 may include a microphone, a keyboard/keypad, or a touch-sensitive display (such as the touch-sensitive touch screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, while an example device configuration and architecture has been described, other implementations are not limited to the particular configuration and architecture described herein. Thus, this disclosure can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Multiple Stack Navigation

Figure 13:
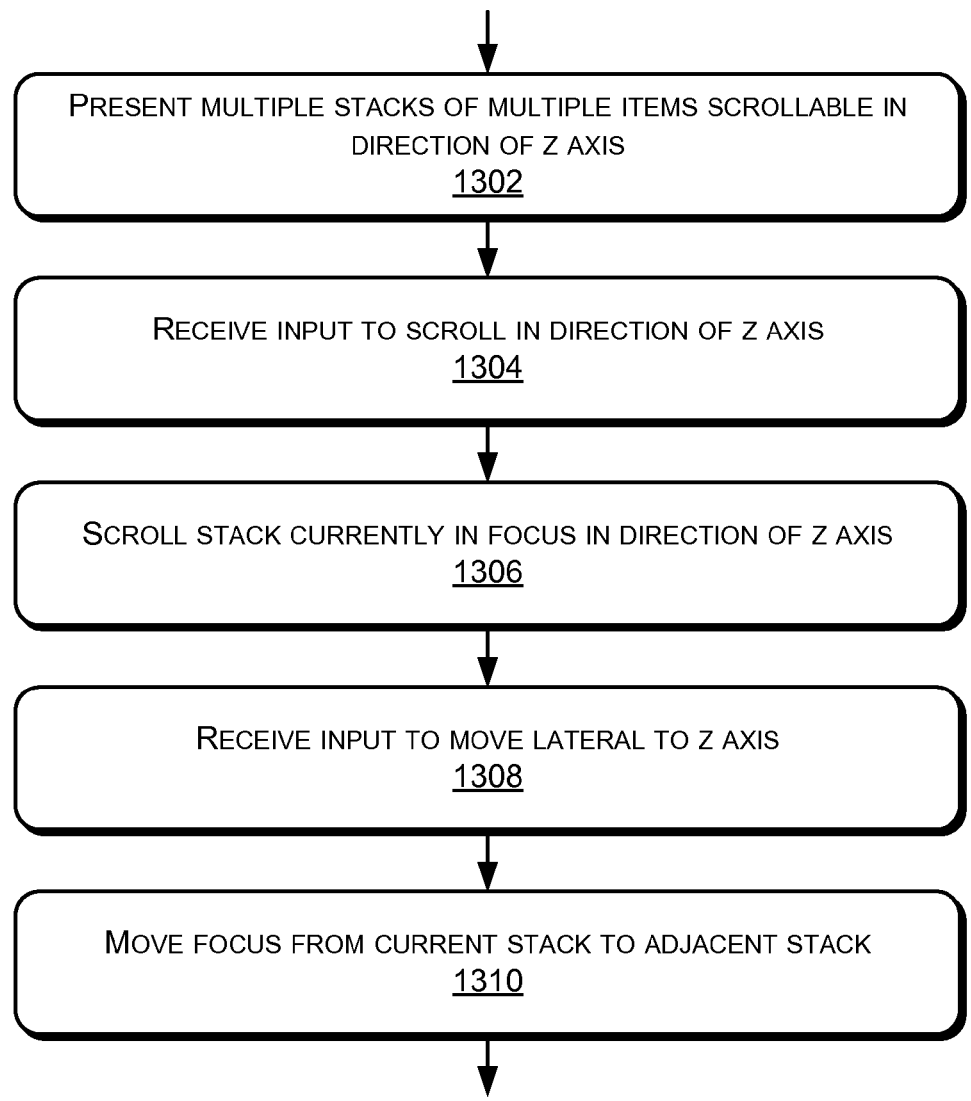
FIG. 13 depicts an example process for navigating multiple stacks in a user interface according to some implementations.

FIG. 13 illustrates an example of a process 1300 for multiple stack navigation according to some implementations herein. In the flow diagram, the operations are summarized in individual blocks. The operations may be performed in hardware, or as processor-executable instructions (software or firmware) that may be executed by one or more processors. Further, the process 1300 may, but need not necessarily, be implemented using the systems, environments and interfaces of FIGS. 8-11.

At block 1302, multiple stacks of multiple items scrollable in the z-axis direction are presented in a user interface 800. For example, each of the stacks is of a different data type, different application, or the like. The items in each stack may be presented and viewed by scrolling along the z-axis.

At block 1304, input is received to scroll in the direction of the z-axis. For example, input may be received from a finger position control system, from a slider, or from another input mechanism.

At block 1306, the user interface scrolls through one or more of the items in the stack that is currently in the focus of the user interface.

At block 1308, input is received to move the focus of the user interface laterally. For example, a user may swipe the representation of the currently presented item to the left or right to move in the direction of the x-axis. Other controls may also be used.

At block 1310, the user interface moves the focus to an item in the adjacent stack. For example, in some implementations, the focus may move to an item at the same depth as the item in the previous stack. In other implementations, the user interface may move the focus to the first item in the adjacent stack.

CONCLUSION

Although the subject matter has been described in language specific to structural features and/or methodological acts, the subject matter defined in the appended claims is not limited to the specific features or acts described. Rather, the specific features and acts are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising: presenting a plurality of first items in a user interface on a display of a device, the first items being presented as a first stack;
   scrolling the first items of the first stack in a direction oblique to a plane of the display for successively displaying the items, wherein:
   the first stack appears to flow outward with respect to the plane of the display in response to scrolling in a first direction;
   the first stack appears to flow inward with respect to the plane of the display in response to scrolling in a second direction; and
   determining a position of a finger spatially separated from the device, the position of the finger being used in conjunction with activation of an input mechanism for interacting with the user interface in three dimensions, wherein
   movement of the finger is determined based on an initial position of the finger that is established in response to actuation of at least one touch or pressure sensor on an exterior of the device;
   the initial position of the finger includes at least an initial spatial separation of the finger from the device along a z-axis defined with respect to a plane of the display
   a speed of scrolling is controlled by a distance that a finger is moved toward or away from the plane of the display, wherein the distance is determined with respect to the initial spatial separation of the finger from the device;
   receiving a selection of one of the first items of the first stack; and
   in response to the selection of one of the first items of the first stack, presenting a plurality of second items in the user interface, the second items being hierarchically related to the first item and being presented in a second stack scrollable in the direction oblique to the plane of the display, wherein:
   the second stack appears to flow outward with respect to the plane of the display in response to scrolling in the first direction; and
   the second stack appears to flow inward with respect to the plane of the display in response to scrolling in the second direction.

2. The method according to claim 1, further comprising:
   sensing a position of the device;
   detecting tilting of the device relative to the position; and
   performing the scrolling in response to the tilting.

3. The method according to claim 1, further comprising:
   sensing movement of a finger of a user sliding along a surface of the device; and
   performing the scrolling in response to movement of the finger.

4. The method according to claim 1, wherein
   the first items are representations of applications present on the device; and
   the second items are representations of a data type of an application that corresponds to the selected one of the first items.

5. The method according to claim 1, further comprising:
   presenting a plurality of stacks of items including the first stack of the first items and a third stack of third items; and
   moving a focus of the user interface in a direction corresponding to the plane of the display between a presentation of the first stack and a presentation of the third stack.

6. The method according to claim 5, wherein the user interface is configured to continually successively display each of the plurality of stacks in a loop by scrolling a focus of the user interface from the first stack to a stack immediately adjacent to the first stack, pause for a predetermined period of time at each stack, and move the focus to a next adjacent stack.

7. A device comprising:
   a display;
   a processor in communication with computer-readable storage media;
   a user interface component, maintained in the computer-readable storage media and executed on the processor, to present a user interface on the display, the user interface being interactive in three dimensions;
   an input mechanism for providing a user-activated input signal to the processor;
   at least one touch or pressure sensor on an exterior of the device;
   a finger position component executed on the processor for determining a position of a finger spatially separated from the device, the position of the finger being used in conjunction with activation of the input mechanism for interacting with the user interface in the three dimensions, wherein:
   movement of the finger is determined based on an initial position of the finger that is established in response to actuation of the at least one touch or pressure sensor,
   the initial position of the finger includes at least an initial spatial separation of the finger from the device along a direction of a z-axis defined with respect to a plane of the display,
   the interface displays a plurality of items in a stack, the stack comprising a displayed item and a plurality of items behind the displayed item,
   movement of the finger toward or away from the device causes the user interface to scroll through one or more of the items in the stack along the direction of the z-axis,
   a speed of the scrolling is controlled by a distance that the finger is moved toward or away from the plane of the display along the direction of the z-axis, and
   the distance is determined with respect to the initial spatial separation of the finger from the device.

8. The device according to claim 7, wherein the speed of the scrolling in a first direction along the z-axis is reduced in response to detecting a change in spatial separation of the finger from the device associated with movement of the finger in a second direction along the z-axis, wherein the change in spatial separation is determined with respect to the initial spatial separation of the finger from the device.

9. The device according to claim 7, wherein a scrolling direction is reversed from a first direction along the z-axis to a second direction along the z-axis in response to detecting a change in spatial separation of the finger from the device associated with movement of the finger in the second direction along the z-axis, wherein the change in spatial separation is determined with respect to the initial spatial separation of the finger from the device.

10. The device according to claim 7, further comprising a planar display, wherein determining lateral movement of the finger relative to a plane of the display causes the user interface to pan a focus of the user interface in a direction relative to the lateral movement.

11. The device according to claim 7, further comprising at least one sensor for sensing the movement of the finger relative to the device, the at least one sensor comprising at least one of:
- a front facing camera;
- an image capture sensor in conjunction with an infrared light source; or
- a non-touch capacitive sensor.

12. One or more tangible computer readable storage media devices containing instructions to be executed by a processor for implementing a user interface, the user interface comprising:
- a plurality of stacks, each stack comprising a plurality of items in the stack, each stack comprising a first item and a plurality of items behind the first item; and
- a control component for enabling displaying movement of the stacks in a z-axis direction defined with respect to a plane of a display, the control component to perform at least one of:
- in response to navigation in a first direction with respect to the plane of the display, moving the stack outward with respect to the plane of the display along the z-axis direction; or
- in response to navigation in a second direction with respect to the plane of the display, moving the stack inward with respect to the plane of the display;
- wherein navigation in the first direction and the second direction comprises:
- determining a position of a finger spatially separated from the device, the position of the finger being used in conjunction with activation of an input mechanism for interacting with the user interface in three dimensions, wherein:
- movement of the finger is determined based on an initial position of the finger that is established in response to actuation of at least one touch or pressure sensor on an exterior of the device;
- the initial position of the finger includes at least an initial spatial separation of the finger from the device along a z-axis defined with respect to a plane of the display;
- wherein a speed of movement of the stacks is controlled by a distance that the finger is moved toward or away from the plane of the display along the z-axis direction and the distance is determined with respect to the initial spatial separation of the finger from the device.

13. The one or more tangible computer readable storage media devices according to claim 12, wherein
- a focus of the user interface includes display of at least one of the stacks; and
- a stack is movable in a direction in the plane of the display to view an adjacent stack.

14. The one or more tangible computer readable storage media devices according to claim 13, wherein each stack in the plurality of stacks is successively looped through and displayed for a predetermined amount of time in the focus of the user interface.

15. The one or more tangible computer readable storage media devices according to claim 12, wherein following movement along the z-axis within a stack, the user interface is configured to enable lateral movement to an item of an adjacent stack.

16. The one or more tangible computer readable storage media devices according to claim 15, wherein the item of the adjacent stack is at an equivalent hierarchical level.

17. The one or more tangible computer readable storage media devices according to claim 15, wherein the item of the adjacent stack is a first item of the adjacent stack.

* * * * *